United States Patent
Wolf et al.

(10) Patent No.: US 11,232,703 B1
(45) Date of Patent: Jan. 25, 2022

(54) VERIFICATION OF VISUAL INSPECTION OF A FIRE CONTROL SYSTEM HAVING SELF-TESTING COMPONENTS

(71) Applicant: Honeywell International Inc., Charlotte, NC (US)

(72) Inventors: Benjamin Wolf, Leicester (GB); Michael Barson, Nuneaton (GB); Christopher Dearden, Melton Mowbray (GB)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/024,280

(22) Filed: Sep. 17, 2020

(51) Int. Cl.
*G08B 29/04* (2006.01)
*H04L 29/06* (2006.01)
*G08B 17/00* (2006.01)

(52) U.S. Cl.
CPC .......... *G08B 29/043* (2013.01); *G08B 17/00* (2013.01); *H04L 63/0876* (2013.01)

(58) Field of Classification Search
CPC .... G08B 29/043; G08B 17/00; H04L 63/0876
USPC ........................................................ 340/506
See application file for complete search history.

(56) References Cited

U.S. PATENT DOCUMENTS

| | | | |
|---|---|---|---|
| 6,313,744 B1* | 11/2001 | Capowski | G08B 7/06 340/506 |
| 7,362,229 B2* | 4/2008 | Brinton | G07C 5/008 340/10.6 |
| 7,649,450 B2* | 1/2010 | Campion, Jr. | G08B 29/123 340/514 |
| 8,106,757 B2* | 1/2012 | Brinton | G08G 1/20 340/439 |
| 9,767,679 B2* | 9/2017 | Piccolo, III | G08B 29/145 |
| 10,216,164 B2* | 2/2019 | Brown | G05B 19/0426 |
| 10,296,022 B2* | 5/2019 | Casilli | H04L 12/2827 |
| 10,380,863 B2* | 8/2019 | Wedig | G08B 17/06 |
| 2020/0394900 A1* | 12/2020 | Lontka | H04N 7/183 |

* cited by examiner

*Primary Examiner* — John A Tweel, Jr.
(74) *Attorney, Agent, or Firm* — Brooks, Cameron & Huebsch, PLLC

(57) ABSTRACT

Devices, methods, and systems for verification of a visual inspection are described herein. One method for visual inspection verification of a fire alarm system having self-testing components includes using a visual inspection verification software mobile application on a mobile device, a technician selects one or more groups of fire alarm system components within areas of a building for visual inspection, wherein each self-testing fire alarm system component has an associated wireless beacon; and wherein each fire alarm system component having an associated wireless beacon emits a unique identifying signal which can be received by the mobile device when the technician moves the mobile device into a range corresponding to a visual distance of the technician to a particular fire alarm system component emitting the unique identifying signal to verify that a technician has been within the range corresponding to a visual distance of the technician to the particular component.

20 Claims, 2 Drawing Sheets

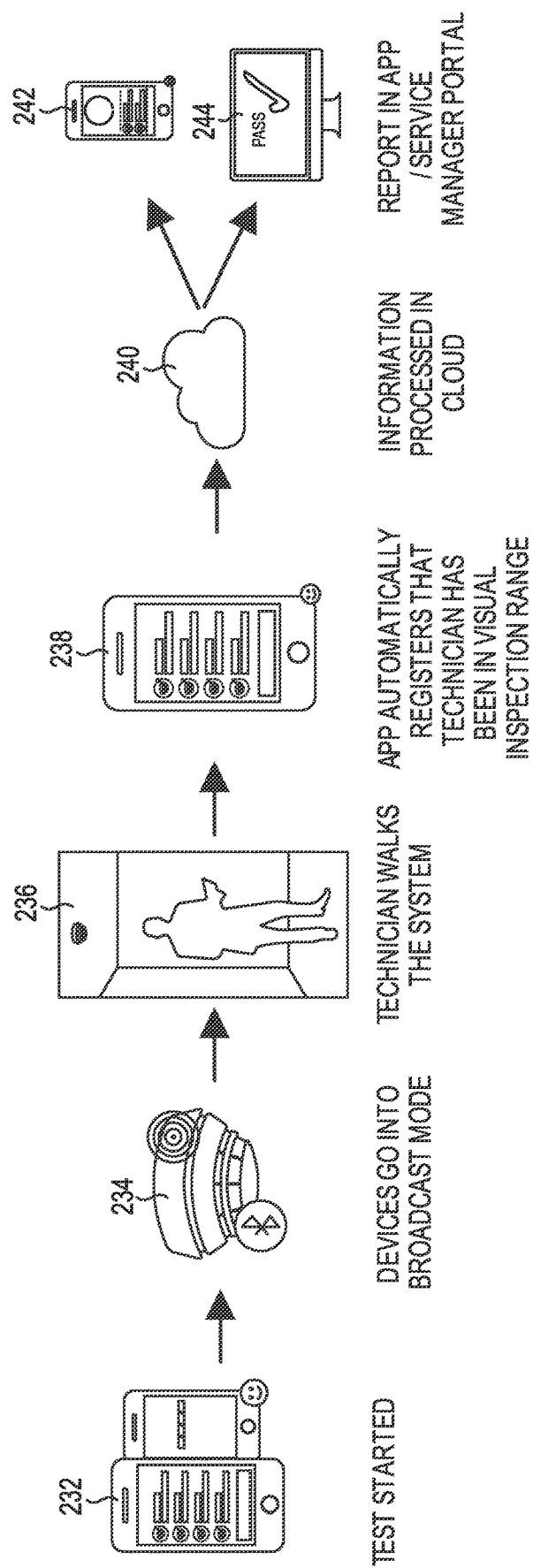

VERIFICATION OF VISUAL INSPECTION OF A FIRE CONTROL SYSTEM HAVING SELF-TESTING COMPONENTS

TECHNICAL FIELD

The present disclosure relates generally to devices, methods, and systems for verification of a visual inspection of a fire control system having self-testing components.

BACKGROUND

The advent of automated, self-testing devices has significantly reduced the time it would take a technician to perform the maintenance or commissioning of a building system, such as a fire control system, an alarm system, or other building system that requires routine inspection. However, it continues to be an important part of codes of practice that a visual inspection has been completed on all relevant parts of the fire alarm system, even if other elements of the testing start to become automated. Consequently, it is important that the audit trail is strong in these processes to ensure that visual inspection has taken place, as the visual inspection can spot hidden issues such as mounting issues, correct device labeling, and spotting things that could inhibit the flow of smoke into a smoke detector for instance.

Currently, the audit trail is accomplished by the inspector keeping track of the items visually inspected on a computerized or paper checklist. One issue with this methodology is that the entity performing the inspections must trust its employee to correctly and truthfully maintain the inspection log as well as ensuring that they haven't missed any part of the system (new additions or difficult to discover devices). If the equipment is not properly maintained, the equipment may not perform as required and could lead to a safety issue in the future.

BRIEF DESCRIPTION OF THE DRAWINGS

FIG. 2 illustrates method flow for a verification of a visual inspection in accordance with an embodiment of the present disclosure.

DETAILED DESCRIPTION

Figure 1:
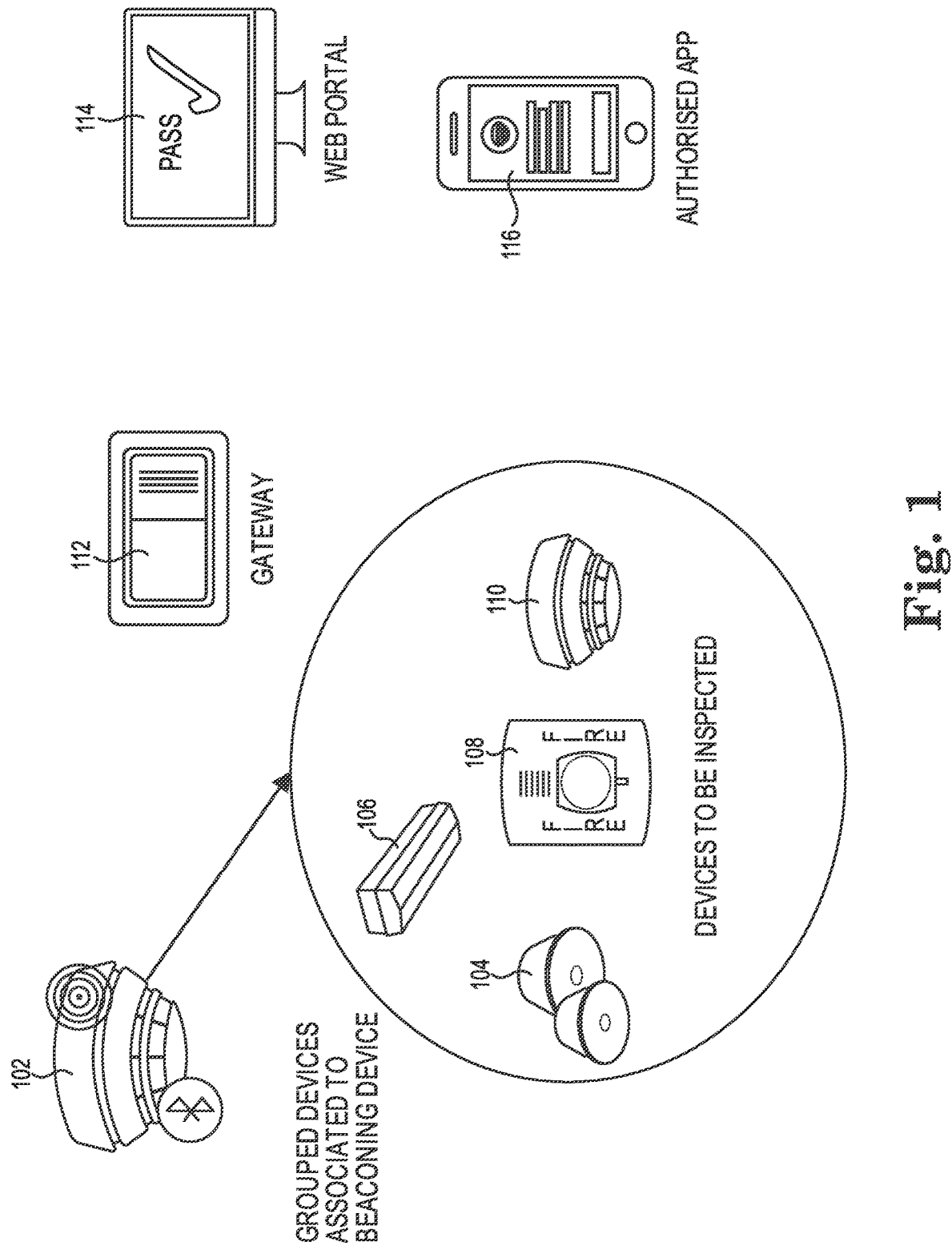
FIG. 1 is an illustration of a system to be inspected and components of an inspection system in accordance with an embodiment of the present disclosure.

The present disclosure relates to the verification that the visual inspections have been completed as part of the building systems commissioning and/or routine maintenance processes for fire control systems having self-testing components.

Currently, a visual inspection comprises of a technician/engineer walking around the building and visually checking the fire control system components, typically, at the same time as they carry out functional testing of the components of the system. For example, carrying out smoke testing of fire sensors and visual inspection of the fire sensors at the same time the inspector is close enough to visually inspect each fire sensor. The current processes tend to be manual and rely on the technician logging/signing off that they have inspected 100% of the devices on the building system and will then, in turn, submit this to the customer as proof of the successful completion of the maintenance visit.

The present disclosure resolves the safety issues related to the 100% completion of the visual inspection as well as reducing the work hours required by technicians by providing a fast way to do and record visual inspections to maximize productivity on site when performing commissioning and maintenance activities and in maintaining visual inspection records for audit purposes. As such, devices, methods, and systems for verification of a visual inspection are described herein. As discussed above, the present disclosure is applicable to fire control systems such as fire detection and alarm systems.

One method for visual inspection verification of a fire alarm system having self-testing components includes using a visual inspection verification software mobile application on a mobile device, a technician selects one or more groups of fire alarm system components within areas of a building for visual inspection, wherein each self-testing fire alarm system component has an associated wireless beacon; and wherein each fire alarm system component having an associated wireless beacon emits a unique identifying signal which can be received by the mobile device when the technician moves the mobile device into a range corresponding to a visual distance of the technician to a particular fire alarm system component emitting the unique identifying signal to verify that a technician has been within the range corresponding to a visual distance of the technician to the particular component. A mobile device can, for example, be a mobile computer, such as a laptop, a tablet, a phone, or any other mobile computing device that can be utilized with the visual inspection verification software mobile application.

All elements of the building's life safety system, which could, for example, include fire sensors, such as smoke detectors, heat detectors, carbon monoxide detectors, or combinations of these three; interfaces; pull stations; input/output modules, aspirating units, and/or audio/visual devices which should be visually inspected. As used herein, these elements are referred to as components of a life safety system (e.g., fire alarm system).

Some of these components can be automatic, self-test devices, such as smoke detectors, heat detectors, carbon monoxide detectors, wherein the devices include mechanisms that generate aerosols, heat, carbon monoxide, etc. and sense these items as appropriate to the type of detector being tested in the device to test the performance of the device. This can, for example, be to test the device's thermal and/or photo sensing capabilities.

Automatic self-testing means that such tests can be initiated from a location remote from the device to be tested, such as from a fire control panel or the mobile device used by a technician (whether remote or near the device to be tested). Through such testing, devices can be tested more quickly and may be tested in parallel whereas prior processes required technicians to bring their testing equipment to each device and test them one at a time.

Self-testing can be accomplished while the life safety system is fully active, meaning that building occupants can still be warned of a safety concern while the self-testing process is being implemented. This is contrary to prior systems, where portions of or the entire system must be taken off-line during testing.

An example system that can be utilized with the embodiments of the present disclosure can include the following components:

1. A wireless beacon (e.g., a signal transmitter such as a Bluetooth transmitter) placed on or integrated into components of the building system that require a visual inspection. When activated, the beacon will transmit a signal uniquely identifying that particular device and its name, device number, and physical location within the building.

2. A mobile application (e.g., used on a smartphone, laptop, tablet, etc.) used by the building system inspector to manage and record the inspection process as the inspector walks around the building. The mobile application can receive location signals from Wireless beacons within visual inspection range and interpret identification (ID) and location information therefrom.

3. An Internet gateway located in the building to connect the building system to a remote server (e.g., a cloud server).

4. Online portal with services to allow the visual inspection verification application to interact with building system components and wireless beacons and to facilitate the storage and retrieval of visual inspection records.

Inspection Workflow:

The building systems inspector can use the visual inspection verification application to select one or more areas of the building for visual inspection. This can, for example, be done on a floor by floor basis or area by area on one floor or multiple floor basis as the inspector walks around the building.

For example, the inspector can select life safety components on a single floor and visually check them all before moving to the next floor. In such an implementation, the inspector can select all life safety components located on a floor, regardless of component type, or can select one or more types of components (e.g., emergency lighting, when the inspector has supplies or tools to fix those items) from a group of components to do first and then inspect the non-selected components at a later time (e.g., when they have tools or supplies to fix those items).

Similarly, the inspector can select, via the visual inspection verification application, a particular type of component to inspect in a larger area, such as on multiple floors or the entire building and inspect those components (e.g., emergency lighting in a west wing of a building that has multiple floors).

To make this process possible, the inspector or technician can assign a particular component to one or more groups within the visual inspection verification application. For example, emergency lighting component identifier (ID) 106 can be grouped with: emergency lighting, floor two components, building three components, sector seven components, floor two-kitchen components, etc. The groupings can be any suitable grouping that would assist the inspector in carrying out the visual inspection.

As the inspector walks around the building, the visual inspection verification application receives signals from all wireless beacons within a visual inspection range. To avoid the problem of the visual inspection verification application detecting unwanted beacon signals from devices in uninspected areas of the building, the system can be configured to only activate those wireless beacons located within the inspection area(s) selected by the technician or provided in a pre-selected order (e.g., an order determined on a previous visit that has been stored on a remote server and retrieved for the present visit), in some embodiments.

For each building system component being inspected, the following procedures can be carried out:

1. The inspector approaches a particular component and selects the particular component for inspection using the visual inspection verification application.

2. The application will initiate a signal to the component under inspection for the component to provide visual or audible feedback to the inspector to confirm that the inspector is inspecting the correct component.

3. The inspector carries out the inspection and through the visual inspection verification application, confirms that the component is in working order. (e.g., there are no evident issues with the device, it is not damaged, covered, incorrectly sited, room usage has not changed, and/or that the component is generally fit to carry out its function within the building).

4. The inspector could associate (in the app/pc tool) a series of other non-beaconing components with a component which does have a beacon if it is within the same visual inspection range of beaconing component, meaning a wider verification of non-connected components could take place.

5. When the inspector comes into range of the beacon, it could also prompt the inspector to carry out specific tasks related to the maintenance process when in that area (e.g., check riser closet on the left for sprinkler system flow switches).

In some embodiments, the visual inspection verification application will, for example, allow the inspector to record any problems identified during the inspection, list remedial work required, and/or attach a photo of the component, if desired. If the identification data or the location data of the component is found to be incorrect, the inspector can use the visual inspection verification application to amend the data and upload the change to a remote server. Further, the photo can prove that the inspector was in visible range of the device, which can be helpful for audit purposes.

Examples of issues that may be discovered by visual testing include: identifying if the ID of the device is incorrect in the system, identifying if the device is referenced in the system as being in the wrong location (potentially sending fire fighters to the wrong location), the device housing is out of position (hanging off the ceiling), or the device is positioned too close to an item that could block smoke entry, among other issues.

Once the inspection for each system component has been completed, the visual inspection verification application can log the date, time (time stamp recorded), inspector identity, component details, building location, and inspection results and upload the data to the remote server. The system can, then, automatically switch off the wireless beacon, in some embodiments. In some implementations, a confirmation that the component has been tested can be saved in the memory of the component. All of the outcomes relating to the inspection data can be uploaded to a remote server in order for it to be accessed by authorized personnel within one or both the service provider's organization and the building owner's organization. Such a feature may be beneficial with respect to auditing the inspection process.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an illustration of a system to be inspected and components of an inspection system in accordance with an embodiment of the present disclosure. The system illustrated in FIG. 1 includes components that are to be inspected (components 102, 104, 106, 108, 110) and visual inspection verification devices (114, 116) with a gateway device 112 allowing access to the components by the verification devices.

In this embodiment, the verification devices share information between each other and the components to be inspected. For example, the mobile device 116 includes a visual inspection verification application that is a software program stored in memory on the mobile device and its program instructions are executable by a processor.

The mobile device is configured to send and receive signals to and from device 114 and components 102, 104, 106, 108, 110. For instance, the mobile device can send a signal to a particular component under inspection to instruct the component to provide visual or audible feedback, via the associated wireless beacon, to the inspector to confirm that the inspector is inspecting the correct component. Visual feedback can be a constant or flashing light or a light that changes color, for example.

The mobile device can also log a confirmation that the particular component is in working order once the visual inspection has been carried out and then send that confirmation to the web portal 114 (e.g., providing access to the Internet in order to communicate with a server at a location remote from the building, where information about the components can be sent, stored, and retrieved via communication with the mobile device 116). This can be beneficial where a first inspector inspects on a first visit and a second inspector inspects on a second visit. This implementation allows information about the building's system to be sent to the remote location, via the mobile device of the first inspector, and stored and then retrieved and sent to the mobile device of the second inspector in preparation for their visit to the building.

Information that can be compiled on the mobile device and sent through the web portal 114 to a remote server can, for example, be: an indication that the particular component is in working order once the visual inspection has been carried out, notes about the condition of the particular component based on the visual inspection, and/or changes to information regarding the particular component stored in memory on the remote server.

Notes about the condition of the particular component based on the visual inspection can, for example, include: problems identified during the inspection, a list of remedial work required, and/or providing a photo of a particular component, or other suitable items that an inspector may want to note about a particular component. Other examples of notes that could be provided are reminders to visually inspect other components that are nearby a component that is broadcasting a signal (e.g., dumb components, such as a pull station in a fire alarm system that will not broadcast a signal, but should be inspected), and specific directions to hard to find components, like "three tiles down and seven tiles over from the SW corner of the room" or "in the cabinet next to the riser".

Further, in some embodiments, the visual inspection verification application can take these notes and make them into reminders that can be displayed on the user interface of the mobile device when the inspector prepares to visit the building or during the inspection process. This can be accomplished, for example, by scrubbing the notes for reminder data and constructing a calendar reminder or a reminder to be brought up when a component is to be inspected. This will reduce the possibility that the hard to find components or components without wireless beacons do not get missed during the inspection process. It could also flag that an area where they could not get access requires access from the janitor, building owner, or other facility representative in order to fully carry out the inspection.

Changes to information regarding the particular component stored in memory on the remote server can, for example, include where the identification data or the location data of a particular component is found to be incorrect, the inspector can use the visual inspection verification application to amend the data and upload the change to a remote server. For example, the inspector may find that the component identifier is an incorrect number and actually identifies a component in another location. The inspector may also find that a particular component ID indicates a component is in the kitchen, but it is actually located in a hallway outside the kitchen. Such changes can be made to the data by the inspector via the mobile application and then the changes can be sent to the remote server.

Changes to information regarding the particular component stored in memory on the remote server can also include: logging a date of inspection, time of inspection, location of mobile device in relation to particular component to be inspected (e.g., having a higher signal strength value than other nearby broadcasting components, or other measurements of proximity to the component being inspected), inspector identity (e.g., name of the inspector or inspector ID number, etc.), component ID details (e.g., name, serial number, brand model, version, etc.), component location details (e.g., building, section, zone group, room, area location within room/area, etc.), and inspection results (e.g., component 110 operational, but visual inspection found that the mounting bracket was loose). In some embodiments, this information can be used to validate whether the inspector was actually in proximity to the component being inspected.

In various embodiments, the visual inspection verification application sends an instruction to a component to switch off its associated wireless beacon once the confirmation of visual inspection is received. The wireless beacon can be integrated into a component or can be a separate component.

In some embodiments, a set of components can be grouped together, such as all components of a fire alarm system that are located within a zone of a building having multiple zones. In such an embodiment, the group can have a single wireless beacon. Groups of components can also share the mechanism that provides audible or visual feedback.

The group of components can be selected, for example, from groups including: building on a campus having several buildings, an area within a building, sector/zone of the building, floor of the building, room of a building, and component type (e.g., brand, model, version, or function, such as fire alarm, pull station, or emergency lighting). As discussed above, a particular component can be assigned to multiple groups, such as: emergency lighting, Honeywell, version 2.6, kitchen, zone 3, building 2.

The inspector then has a number of grouping options available on the user interface of the visual inspection verification application that they can select from to select the group of components that they desire to inspect. This assignment information can, then, be sent to the remote server to be stored in memory and accessed by the inspector on their next visit or by another inspector upon their next visit. This information may also be stored on the mobile device 116.

In some embodiments, the visual inspection verification mobile device 116 includes the visual inspection verification application wherein it is configured to: provide a visual inspection plan to enable the inspector to navigate the building in the correct order. The visual inspection plan is a guide to help the inspector complete the visual inspections in an orderly manner. In various embodiments, the inspector can select from a number of order options, such as starting from a particular location and ending at another location (e.g., top floor to bottom floor, front of a floor to back, from the location of the mobile device to the lobby) or inspecting a particular group or groups.

The visual inspection plan can then be presented to the inspector via a user interface of the mobile device 116, for example, in the form of a text format list or a multi-dimensional map (2-dimensional, 3-dimensional). For instance, the visual inspection plan can be a list of directions for the inspector to follow from one component location to a next component location.

As discussed above, the visual inspection plan can also be a map showing the locations of at least one component to be inspected. In some embodiments, the map can also show the location of the mobile device and this data can be saved for verification that the inspector was in proximity of the particular component such that a visual inspection could have been accomplished.

FIG. 2 illustrates method flow for a verification of a visual inspection in accordance with an embodiment of the present disclosure. In this embodiment, the method flow begins with the testing/inspection process via the visual inspection verification application on the mobile device being initiated to track the inspection process, at 232.

When the application is initiated, the inspector selects which components are to be inspected and the application sends a signal to one or more components or groups of components, based on that selection, to go into broadcast mode, at 234. In this mode, the components selected by the inspector begin to broadcast either audible or visual feedback via their associated wireless beacons (integrated or separate). They can, for example broadcast a signal that includes a unique identifier that is associated with that particular component. The mobile device receives the identifier and then correlates it with information, stored in memory, associated with the particular component.

The mobile application of the mobile device then receives signals from all wireless beacons within a visual inspection range of the mobile device. In some implementations, the mobile application can prioritize the components as the inspector moves around the building.

For example, the inspector starts by component 1 and components 2, 3, and 4 are listed in that order due to their proximity to component 1. However, as the inspector moves from component 1 to 2, the order switches for the next components, listing component 4 ahead of 3 due to it being closer to component 2. This ordering can be based, for example, on Bluetooth signal strength, transmitted by each component's wireless beacon, measured by the mobile device, with the highest signal strength being list first as it is presumably closest to the mobile device.

In some embodiments, only those wireless beacons located within visual inspection range and having been selected in the one or more groups of components selected by the inspector are activated.

A particular component having an activated wireless beacon is then selected for inspection. This can be accomplished by selection by the inspector or automatically by the visual inspection verification application based on the closest proximity of the activated components to the mobile device.

In some embodiments, a set of components can be grouped together and the visual inspection verification application can be configured such that when the mobile device is within a threshold proximity of a particular component within the group, the visual inspection verification application marks all components in the group as being visually inspected. This presumes that at the position the inspector is in with the mobile device, all components of the group are visible.

Additionally, in some embodiments the visual inspection verification application can be configured such that when the mobile device is within a threshold proximity of any component within the group, the visual inspection verification application marks all components in the group as being visually inspected. This presumes that at the position the inspector is in with the mobile device, all components of the group are visible.

The inspector, then, begins to walk around the building to inspect components to be inspected, at 236. This can be aided by a visual inspection plan provided via the user interface of the mobile device.

When the mobile device is within a certain proximity, the application can register that the inspector has been in visual inspection range, at 238. Once the inspection is completed and information about the component that was just inspected has been collected, that information is sent to a remote server in a remote location and the information is processed and stored, at 240. A confirmation of completion of the inspection can then be sent, with any associated information to the visual inspection verification application, at 242, and/or to the system manager portal, at 244.

In addition to the mobile device automatically registering that the technician has been in visual inspection range, in some embodiments, the visual inspection verification application can also include a functionality to require the inspector to confirm (e.g., audibly, by touch to the screen of the mobile device, etc.) that they have been within visible inspection range of the component to be inspected. This can be accomplished, for example, by correlating the time of the confirmation to a location of the mobile device. This action provides further certainty that the inspector was actually proximate to the component to be inspected.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for visual inspection verification of a fire alarm system having self-testing components, comprising:
using a visual inspection verification software mobile application on a mobile device, a technician selects one or more groups of fire alarm system components within areas of a building for visual inspection, wherein each self-testing fire alarm system component has an associated wireless beacon; and
wherein each fire alarm system component having an associated wireless beacon emits a unique identifying signal which can be received by the mobile device when the technician moves the mobile device into a range corresponding to a visual distance of the technician to a particular fire alarm system component emitting the unique identifying signal to verify that a technician has been within the range corresponding to a visual distance of the technician to the particular fire alarm system component.

2. The method of claim 1, further including:
signaling to the particular fire alarm system component under inspection to provide visual or audible feedback via the associated wireless beacon to the inspector to confirm that the inspector is inspecting the correct component; and
confirming, via the visual inspection verification application, that the particular fire alarm system component is in working order once the visual inspection has been carried out.

3. The method of claim 1, further including:
sending to a remote server, via the visual inspection verification application, at least one of: an indication that the particular fire alarm system component is in working order once the visual inspection has been carried out, notes about the condition of the particular component based on the visual inspection, and changes to information regarding the particular fire alarm system component stored in memory on the remote server.

4. The method of claim 3, wherein the notes about the condition of the particular fire alarm system component based on the visual inspection include at least one of: problems identified during the inspection, list of remedial work required, and providing a photo of a particular fire alarm system component.

5. The method of claim 3, wherein the changes to information regarding the particular fire alarm system component stored in memory on the remote server includes where identification data or location data of a particular fire alarm system component is found to be incorrect, the inspector can use the visual inspection verification application to amend the data and upload the change to a remote server.

6. The method of claim 3, wherein the changes to information regarding the particular fire alarm system component stored in memory on the remote server includes at least one of: logging a date of inspection, time of inspection, location of mobile device in relation to the particular fire alarm system component to be inspected, inspector identity, component identifier (ID) details, component location details, and inspection results.

7. The method of claim 1, wherein the visual inspection verification application sends an instruction to switch off the wireless beacon once the confirmation of visual inspection is received.

8. A visual inspection verification mobile device for a fire control system having self-testing fire alarm system components, comprising:
a visual inspection verification software mobile application on the mobile device configured to:
provide an access portal for a technician to select one or more groups of fire alarm system components within areas of the building for visual inspection, wherein each fire alarm system component is associated with a wireless beacon;
receive signals from all wireless beacons within a visual inspection range of the mobile device;
and wherein the application activates those wireless beacons located within visual inspection range and having been selected in the one or more groups of fire alarm system components selected by the technician.

9. The visual inspection verification mobile device of claim 8, wherein the group of fire alarm system components can be selected from groups including: area within a building, sector of the building, floor of the building, and component type.

10. The visual inspection verification mobile device of claim 8, wherein the application is configured to: allow a particular fire alarm system component to be assigned to one or more groups.

11. The visual inspection verification mobile device of claim 9, wherein the application is configured to: send assignment information of a particular fire alarm system component to a remote server.

12. The visual inspection verification mobile device of claim 9, wherein the application is configured to: provide a visual inspection plan to enable the inspector to navigate the building in the correct order.

13. The visual inspection verification mobile device of claim 12, wherein the visual inspection plan is a list of directions for the inspector to follow from one component location to a next component location.

14. The visual inspection verification mobile device of claim 12, wherein the visual inspection plan is a map showing the locations of at least one component to be inspected.

15. A method for visual inspection verification of a fire control system having self-testing components, comprising:
using a visual inspection verification software mobile application on a mobile device, an inspector selects one or more groups of fire alarm system components within areas of the building for visual inspection, wherein each fire alarm system component is associated with a wireless beacon;

receiving, via the visual inspection verification application, signals from all wireless beacons within a visual inspection range of the mobile device; and selecting, via the visual inspection verification application, a particular fire alarm system component having an activated beacon for inspection.

16. The method of claim 15, further including signaling to the particular fire alarm system component under inspection to provide visual or audible feedback to the inspector to confirm that the inspector is inspecting the correct fire alarm system component.

17. The method of claim 15, further including confirming, via the visual inspection verification application, that the particular fire alarm system component is in working order once the visual inspection has been carried out.

18. The method of claim 15, further including sending, via the visual inspection verification application, an indication that the particular fire alarm system component is in working order once the visual inspection has been carried out to a remote server.

19. The method of claim 15, further including sending, via the visual inspection verification application, notes about the condition of the particular fire alarm system component based on the visual inspection to a remote server.

20. The method of claim 15, further including sending, via the visual inspection verification application, changes to information regarding the particular fire alarm system component stored in memory on a remote server.

\* \* \* \* \*